UNITED STATES PATENT OFFICE.

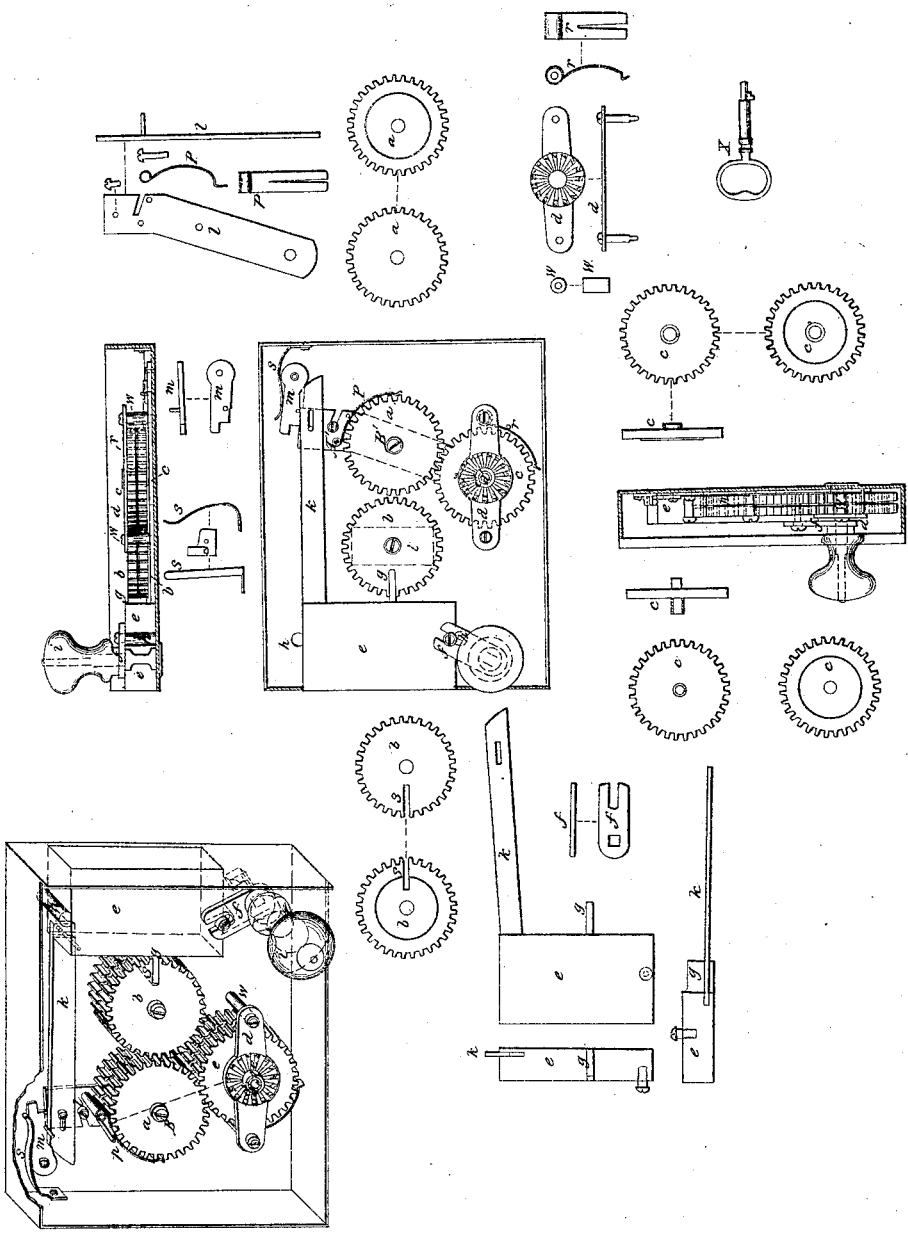

CHARLES S. WESTCOTT, OF NEW YORK, N. Y.

LOCK.

Specification of Letters Patent No. 22,319, dated December 14, 1858.

*To all whom it may concern:*

Be it known that I, CHARLES S. WESTCOTT, of the city, county, and State of New York, have invented certain new and useful Improvements in Locks; and I do hereby declare that the following is a full, clear, and exact description of the same, reference being had to the annexed drawing, making part of this specification.

Figure 1 represents all parts of the lock in combination, the several parts being represented in the drawings in detached views.

($b$) represents two or more revolving disks or wheels in each of which is a slot S. These wheels all revolve upon a common shaft, so that when all the slots are over each other and in a direct line with the shoulder or attachment ($g$) to the bolt ($e$) the shoulder or attachment will enter the slots and thus allow the bolt to be thrown back. The disks ($b$) also act as a stop to prevent the bolt ($e$) from being thrown back when the disks are not in such adjustment as to allow the shoulder or attachment to enter the slots. The bar (K) attached to the bolt is intended to act upon the catch ($m$) raising it up; and also to push back the piece (A′) upon which the wheels ($a$) are fastened by the shaft (B′) upon which they revolve. The wheels ($a$) are geared to turn the slotted wheels ($b$) when the bolt ($e$) is thrown out, and they are drawn into gear by means of the bar (K). These wheels ($a$) are turned by means of the wheels ($c$) the upper one of which is fastened to the shaft ($c′$) and revolves with it; the lower one being fastened to and turning with the shaft ($d′$). The shaft ($d′$) revolves through the shaft ($c′$) thus allowing the lower set of the wheels ($a$ and $b$) to be turned independently while the remaining or upper wheels are stationary.

The wheels ($a$) are thrown out of gear with the slotted wheels ($b$) by means of the bar (K) when the bolt is thrown back. This is done for the purpose of allowing said wheels to be turned by a key ($x$) acting upon the shafts $c′$ and $d′$, so that any one of the teeth upon any of the wheels ($a$) may be placed in position to be drawn into gear with the corresponding notch in any of the slotted wheels ($b$), while the wheels ($b$) are held by the shoulder or attachment ($g$) to the bolt ($e$). Thus various combinations can be made by setting any designated point in the shafts $c′$ and $d′$ to any line upon the graduated plate ($e′$) a duplicate of which graduated plate should be placed upon the outside of the door to which this lock is attached. When all the shafts are turned with the designated points of each to any mark upon the graduated plate ($e′$) (indicated by numbers), the bolt thrown out, and the shafts turned away from the points designated, it will be necessary to turn the slotted wheels back to their first position before the bolt can be again thrown back, or the lock be unlocked. In any endeavor to open the lock without a knowledge of the combination, the cogs or teeth upon the slotted wheels ($b$) serve also to catch the end of the bolt or attachment and thus prevent the turning of all the wheels, if pressure be applied to the bolt with the object of ascertaining the position of the slots. As either of the shafts ($c′$) or ($d′$) may be turned at will, the object of the springs P and $r$ is to prevent any accidental turning of any wheels except those intended.

I have not deemed it necessary to furnish any description of the method of throwing the bolt back and forth as any of the ordinary methods in use will answer the purpose.

I am aware that revolving slotted wheels have been heretofore used and therefore distinctly disclaim the invention of the same. I also disclaim the invention of the direct entering of a shoulder or attachment to the bolt into the slotted wheels. But—

What I claim as my invention and desire to secure by Letters Patent is—

The ungearing of two sets of wheels when a lock is unlocked in such a manner as to allow the slotted wheels which receive the tongue of the bolt to remain stationary while the remaining wheels can be turned to any desired position, so that the combination can be changed through the key-hole from the front of the lock; said ungearing being effected by means of a bar (K) or its equivalent acting upon a movable piece of metal which supports the shaft upon which one set of the wheels revolves; said bar being moved by the action of throwing the bolt so as to throw one set of wheels out of gear with the slotted wheels when the lock is unlocked and bring them into gear again when it is locked.

CHAS. S. WESTCOTT.

Witnesses:
GEO. H. BISSELL,
J. G. EVELETH.